United States Patent
Kutty et al.

(10) Patent No.: US 10,855,805 B2
(45) Date of Patent: Dec. 1, 2020

(54) CENTRALIZED STORAGE-CONNECTED SWITCH PORT AUTO-CONFIGURATION SYSTEM

(71) Applicant: Dell Products L.P., Round Rock, TX (US)

(72) Inventors: Ajan Daniel Kutty, Austin, TX (US); Srinivasa Rao Nagalla, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 265 days.

(21) Appl. No.: 15/606,244

(22) Filed: May 26, 2017

(65) Prior Publication Data
US 2018/0343319 A1   Nov. 29, 2018

(51) Int. Cl.
*H04L 29/08* (2006.01)
*H04L 12/721* (2013.01)
*H04L 12/24* (2006.01)
*H04L 12/26* (2006.01)

(52) U.S. Cl.
CPC .......... *H04L 67/32* (2013.01); *H04L 41/0886* (2013.01); *H04L 41/12* (2013.01); *H04L 41/22* (2013.01); *H04L 45/38* (2013.01); *H04L 67/1097* (2013.01); *H04L 67/16* (2013.01); *H04L 67/34* (2013.01); *H04L 43/0882* (2013.01)

(58) Field of Classification Search
CPC ..... H04L 67/32; H04L 41/0886; H04L 41/12; H04L 41/22; H04L 45/38; H04L 67/1097; H04L 67/16; H04L 67/34; H04L 43/0882
See application file for complete search history.

(56) References Cited

U.S. PATENT DOCUMENTS

| 6,775,230 | B1* | 8/2004 | Watanabe | H04L 49/357 370/218 |
| 9,038,151 | B1* | 5/2015 | Chua | H04L 45/02 709/223 |
| 2004/0062200 | A1* | 4/2004 | Kesavan | H04L 47/10 370/235 |
| 2016/0134527 | A1* | 5/2016 | Kwak | H04L 45/586 370/352 |
| 2016/0294734 | A1* | 10/2016 | Jang | H04L 41/0654 |

(Continued)

*Primary Examiner* — Philip J Chea
*Assistant Examiner* — Robert B McAdams
(74) *Attorney, Agent, or Firm* — Haynes and Boone, LLP

(57) ABSTRACT

A centralized storage-connected switch port auto-configuration system includes an SDN controller device that receives, from an SDN switch device subsequent to a storage device being connected to a switch port on the SDN switch device, discovery information and uses it to identify the switch port. The SDN controller device then provides SDN communications to the SDN switch device that include a port packet data unit size configuration, a port traffic suppression configuration, and a port loop prevention configuration. The SDN switch device applies the port packet data unit size configuration to configure a packet data unit size transmittable via the switch port, the port traffic suppression configuration to configure the amount of bandwidth of the switch port that will be available to transmit at least one type of data traffic, and the port loop prevention configuration to configure loop prevention designations that will be available for the switch port.

17 Claims, 6 Drawing Sheets

(56) References Cited

U.S. PATENT DOCUMENTS

| | | | | |
|---|---|---|---|---|
| 2016/0337272 A1* | 11/2016 | Berman | ................. | H04L 49/70 |
| 2017/0104670 A1* | 4/2017 | Song | ................... | H04L 12/6418 |
| 2018/0013630 A1* | 1/2018 | Tatlicioglu | .............. | H04L 41/12 |

\* cited by examiner

CENTRALIZED STORAGE-CONNECTED SWITCH PORT AUTO-CONFIGURATION SYSTEM

BACKGROUND

The present disclosure relates generally to information handling systems, and more particularly to the centralized and automatic configuration of storage-connected switch ports on information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as switch devices are often used to connect, for example, server devices to storage device(s) in storage area networks (SANs.) In a specific example, switch device(s) may connect server device(s) to a plurality of storage devices that are provided in a storage array of a SAN and that communicate via the internet Small Computer Systems Interface (iSCSI) protocol. As would be understood by one of skill in the art, the iSCSI protocol is an Internet Protocol (IP)-based storage networking standard for linking data storage facilities, and may be used to provide block level access to storage devices by carrying SCSI commands that are transmitted over a Transport Control Protocol (TCP)/IP network and that give the server devices the illusion of communicating with locally attached SCSI storage devices. The iSCSI protocol is typically used to facilitate data transfer on intranets and manage storage over relatively long distances, and can be used to transmit data over Local Area Networks (LANs), Wide Area Networks (WANs), and the Internet to enable location-independent data storage and retrieval.

When connecting server device(s) with a SAN via a switch device, it is often necessary to configure the switch device to provide for communications with the storage device(s). For example, a storage device in the SAN may be connected to a port on the switch device, and a configuration may then be applied to that port to optimize iSCSI protocol communications between the switch device and the storage device. In many situations, it is desirable to automate the configuration of such ports to reduce network deployment time and network management complexity. However, in conventional switch devices, the enablement of such automatic port configuration requires a network administrator to configure the switch device in a manner that then enables that switch device to subsequently and automatically configure its ports in a desired manner when storage devices are connected to those ports. As such, each switch device deployed in a network must be manually configured by a network administrator to enable automatic storage-connected port configuration, which saves time when connecting storage devices to that switch device subsequent to the switch device configuration, but still requires substantial manual efforts during network deployment (i.e., each switch device deployed in the network must be manually configured to perform the automatic port configuration as discussed above.)

Accordingly, it would be desirable to provide an improved storage-connected switch port auto-configuration system.

SUMMARY

According to one embodiment, an information handling system (IHS) includes a processing system; and a memory system that is coupled to the processing system and that include instructions that, when executed by the processing system, cause the processing system to provide a Software Defined Networking (SDN) controller engine that is configured to: receive, from an SDN switch device subsequent to a storage device being connected to a switch port on the SDN switch device, discovery information; identify, using the discovery information, the switch port on the SDN switch device that is connected to the storage device; and provide, to the SDN switch device via SDN protocol communications, each of: a port packet data unit size configuration that defines a packet data unit size that will be transmitted via the switch port; a port traffic suppression configuration that defines the amount of bandwidth of the switch port that will be available to transmit at least one type of data traffic; and a port loop prevention configuration that defines loop prevention designations that will be available for the switch port.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
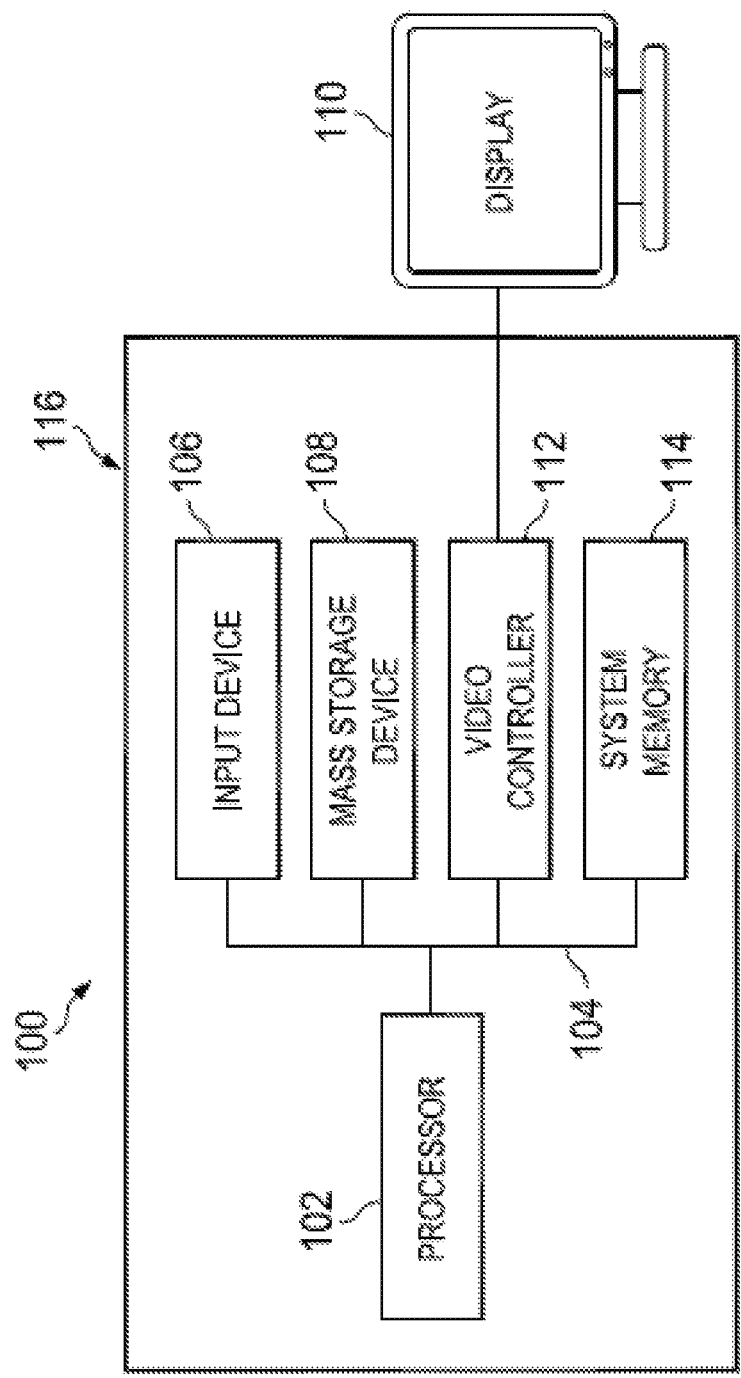
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
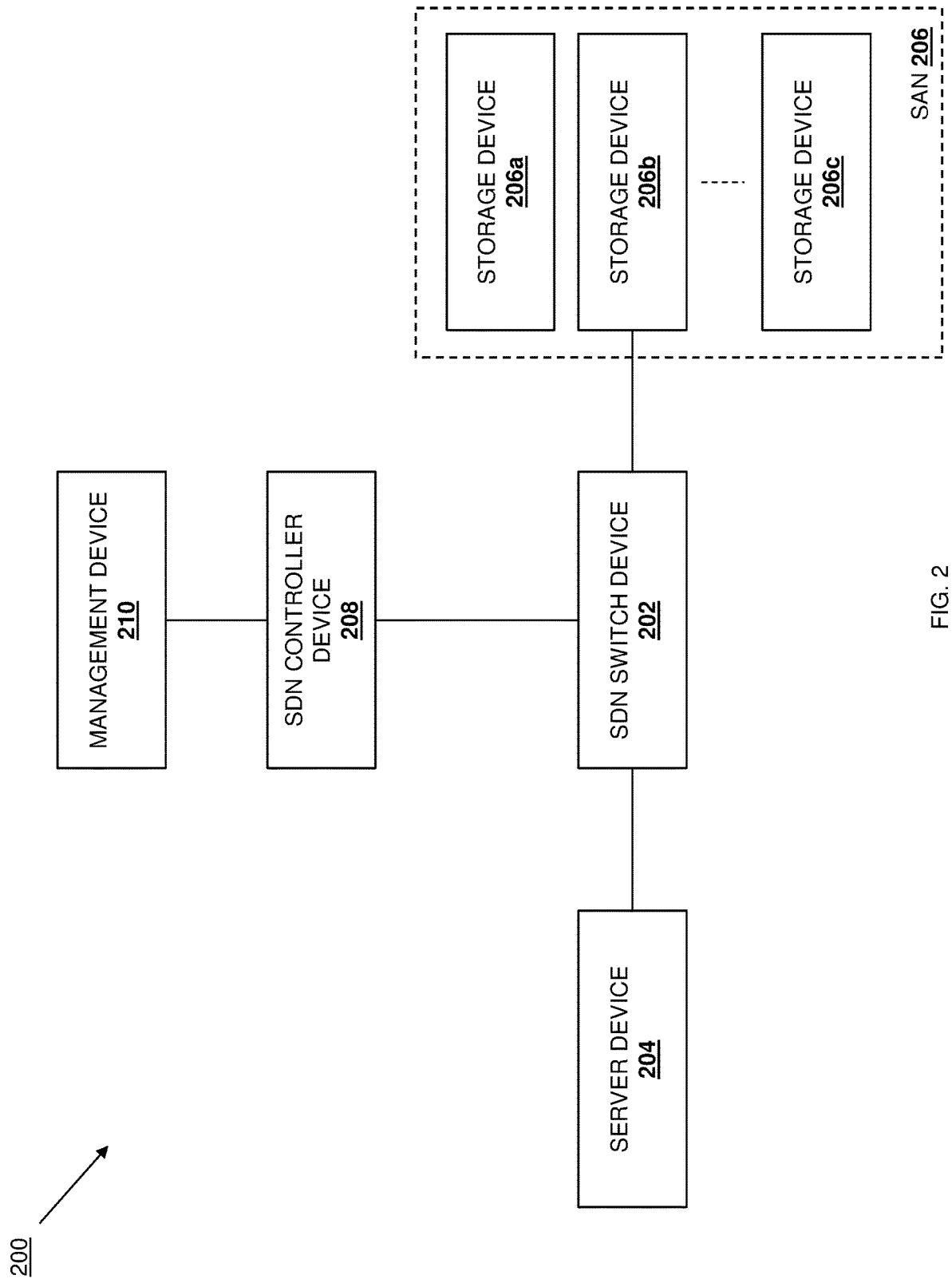
FIG. 2 is a schematic view illustrating an embodiment of a centralized storage-connected switch port auto-configuration system.

Referring now to FIG. 2, an embodiment of a centralized storage-connected switch port auto-configuration system 200 is illustrated. In the illustrated embodiment, the centralized storage-connected switch port auto-configuration system 200 includes a Software Defined Networking (SDN) switch device 202. While only a single SDN switch device is illustrated in the centralized storage-connected switch port auto-configuration system 200, one of skill in the art in possession of the present disclosure will recognize that network fabrics may (and typically will) include many more switch devices, and the inclusion of additional SDN switch devices in the centralized storage-connected switch port auto-configuration system 200 that operate similarly to the SDN switch device 202 will fall within the scope of the present disclosure as well. In an embodiment, the SDN switch device 202 may be the IHS 100 discussed above with reference to FIG. 1, and/or may include some or all of the components of the IHS 100. In the specific embodiments discussed below, the SDN switch device 202 is provided by a switch device that is configured to communicate via the OPENFLOW® protocol, although the use of other SDN protocols (e.g., the Open Network Environment provided by CISCO® Systems of San Jose, Calif., United States; the network virtualization platform provided by NICIRA®/VMWARE of Palo Alto, Calif., United States; and/or other SDN protocols known in the art) will fall within the scope of the present disclosure as well.

In the illustrated embodiment, a server device 204 is coupled to the SDN switch device 202. While only a single server device is illustrated in the centralized storage-connected switch port auto-configuration system 200, one of skill in the art in possession of the present disclosure will recognize that network fabrics may include many more server devices, and the inclusion of additional server devices in the centralized storage-connected switch port auto-configuration system 200 that operate similarly to the server device 208 will fall within the scope of the present disclosure as well. In an embodiment, the server device 204 may be the IHS 100 discussed above with reference to FIG. 1, and/or may include some or all of the components of the IHS 100. In the illustrated embodiment, a Storage Area Network (SAN) 206 is also coupled to the SDN switch device 202, and includes a plurality of storage devices 206a, 206b, and 206c. In the embodiments discussed below, the storage devices 206a-c communicate using the internet Small Computer Systems Interface (iSCSI) protocol, but one of skill in the art in possession of the present disclosure will recognize that storage devices that communicate using other types of protocols may will fall within the scope of the present disclosure as well. In an embodiment, any or all of the storage devices 206a-c may be the IHS 100 discussed above with reference to FIG. 1, and/or may include some or all of the components of the IHS 100

In the illustrated embodiment, an SDN controller device 208 is coupled to the SDN switch device 202. While only a single SDN controller device is illustrated in the centralized storage-connected switch port auto-configuration system 200, one of skill in the art in possession of the present disclosure will recognize that network fabrics may include more SDN controller devices, and the inclusion of additional SDN controller devices in the centralized storage-connected switch port auto-configuration system 200 that operate similarly to the SDN controller device 208 will fall within the scope of the present disclosure as well. In an embodiment, the SDN controller device 208 may be the IHS 100 discussed above with reference to FIG. 1, and/or may include some or all of the components of the IHS 100. In the specific embodiments discussed below, the SDN controller device 202 is provided by a computing device that is configured to communicate via the OPENFLOW® protocol, although the use of other SDN protocols (e.g., the Open Network Environment provided by CISCO® Systems of San Jose, Calif., United States; the network virtualization platform provided by NICIRA®/VMWARE of Palo Alto, Calif., United States; and/or other SDN protocols known in the art) will fall within the scope of the present disclosure as well.

In the illustrated embodiment, a management device 210 is coupled to the SDN controller device 208. In an embodiment, the management device 210 may be the IHS 100 discussed above with reference to FIG. 1, and/or may include some or all of the components of the IHS 100. In specific embodiments, the management device 210 may be provided by a desktop computing device, a laptop/notebook computing device, a tablet computing device, a mobile phone, and/or other management devices known in the art that are configured to provide management commands, display management information, and/or perform any of the other operations of the management devices discussed below. While a specific centralized storage-connected switch port auto-configuration system has been illustrated and described, one of skill in the art in possession of the present disclosure will recognize that a variety of different devices and/or device configurations (other than those illustrated in FIG. 2) may be utilized to provide a centralized storage-connected switch port auto-configuration system that will benefit from the teachings of the present disclosure and thus fall within its scope as well.

Figure 3:
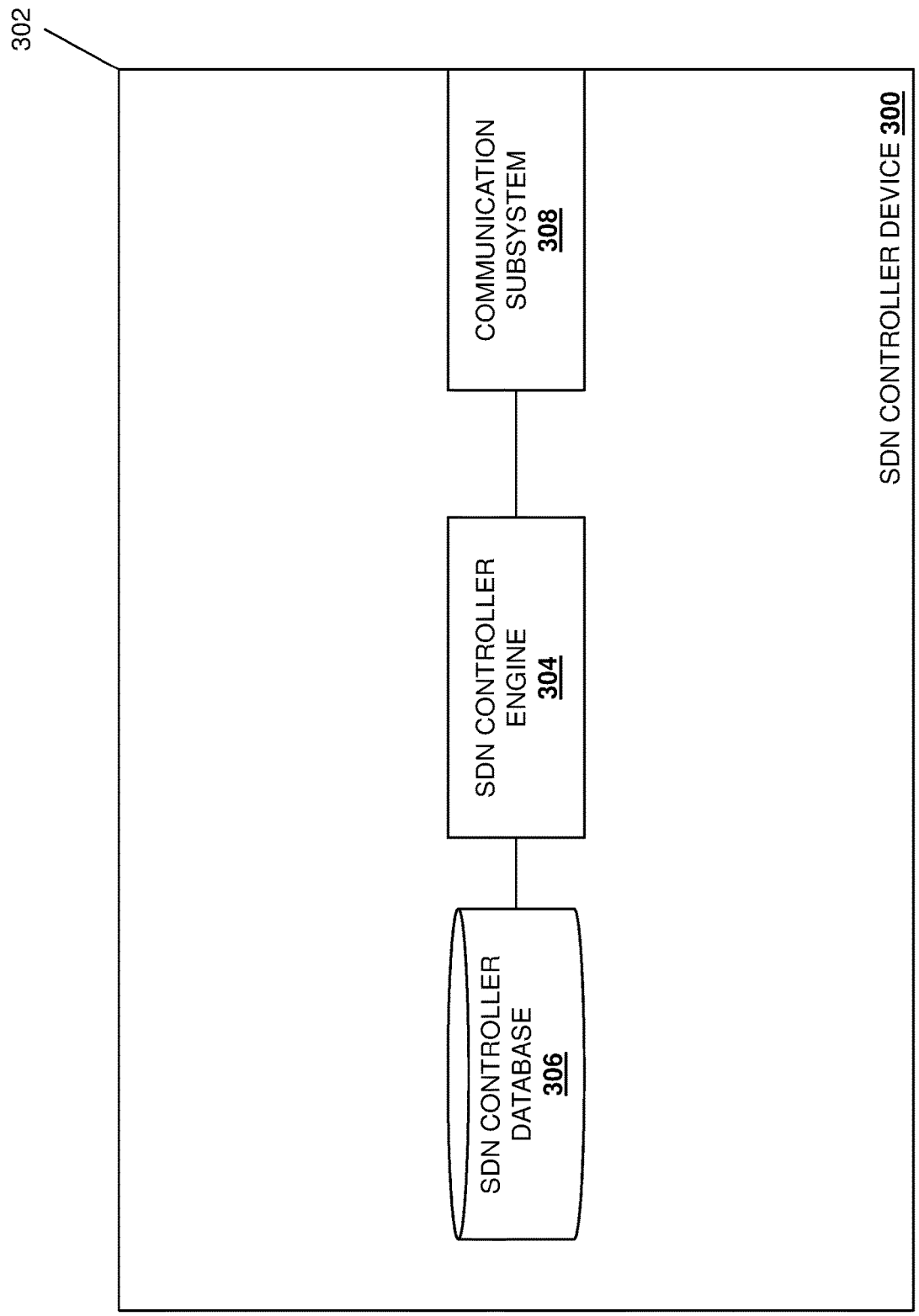
FIG. 3 is a schematic view illustrating an embodiment of a storage defined networking (SDN) controller device used in the centralized storage-connected switch port auto-configuration system of FIG. 2.

Referring now to FIG. 3, an embodiment of an SDN controller device 300 is illustrated that may be the SDN controller device 208 discussed above with reference to FIG. 2. As such, the SDN controller device 300 may be the IHS 100 discussed above with reference to FIG. 1, may include some or all of the components of the IHS 100, and in specific embodiments may be a computing device that is configured to communicate via the OPENFLOW® protocol, although the use of other SDN protocols (e.g., the Open Network Environment provided by CISCO® Systems of San Jose, Calif., United States; the network virtualization platform provided by NICIRA®/VMWARE of Palo Alto, Calif., United States; and/or other SDN protocols known in the art) will fall within the scope of the present disclosure as well. In the illustrated embodiment, the SDN controller device 300 includes a chassis 302 that houses the components of the SDN controller device 300, only some of which are illustrated in FIG. 3. For example, the chassis 302 may house a processing system (not illustrated, but which may include the processor 102 discussed above with reference to FIG. 1) and a memory system (not illustrated, but which may include the memory 114 discussed above with reference to FIG. 1) that includes instructions that, when executed by the processing system, cause the processing system to provide an SDN controller engine 304 that is configured to perform the functions of the SDN controller engines and SDN controller devices discussed below.

The chassis 302 may also house a storage device (not illustrated, but which may include the storage device 108 discussed above with reference to FIG. 1) that is coupled to the SDN controller engine 304 (e.g., via a coupling between the storage device and the processing system) and that includes an SDN controller database 306 that stores data and/or other information utilized to provide the functionality discussed below. The chassis 302 may also house a communication subsystem 308 that is coupled to the SDN controller engine 304 (e.g., via a coupling between the communication subsystem 308 and the processing system) and that may include a Network Interface Controller (NIC), a wireless communication device (e.g., a BLUETOOTH® wireless communication device, a Near Field Communication (NFC) device, a WiFi communication devices, and/or other wireless communication devices known in the art), and/or other communication components known in the art. In a specific embodiment, the communication subsystem 308 may include the ports utilized for providing the links to SDN switch devices and management devices discussed below. While a specific embodiment of an SDN controller device has been illustrated and described, one of skill in the art in possession of the present disclosure will recognize that SDN controller devices may include a variety of other components for providing conventional SDN controller device functionality, as well as the functionality discussed below, while remaining within the scope of the present disclosure.

Figure 4:
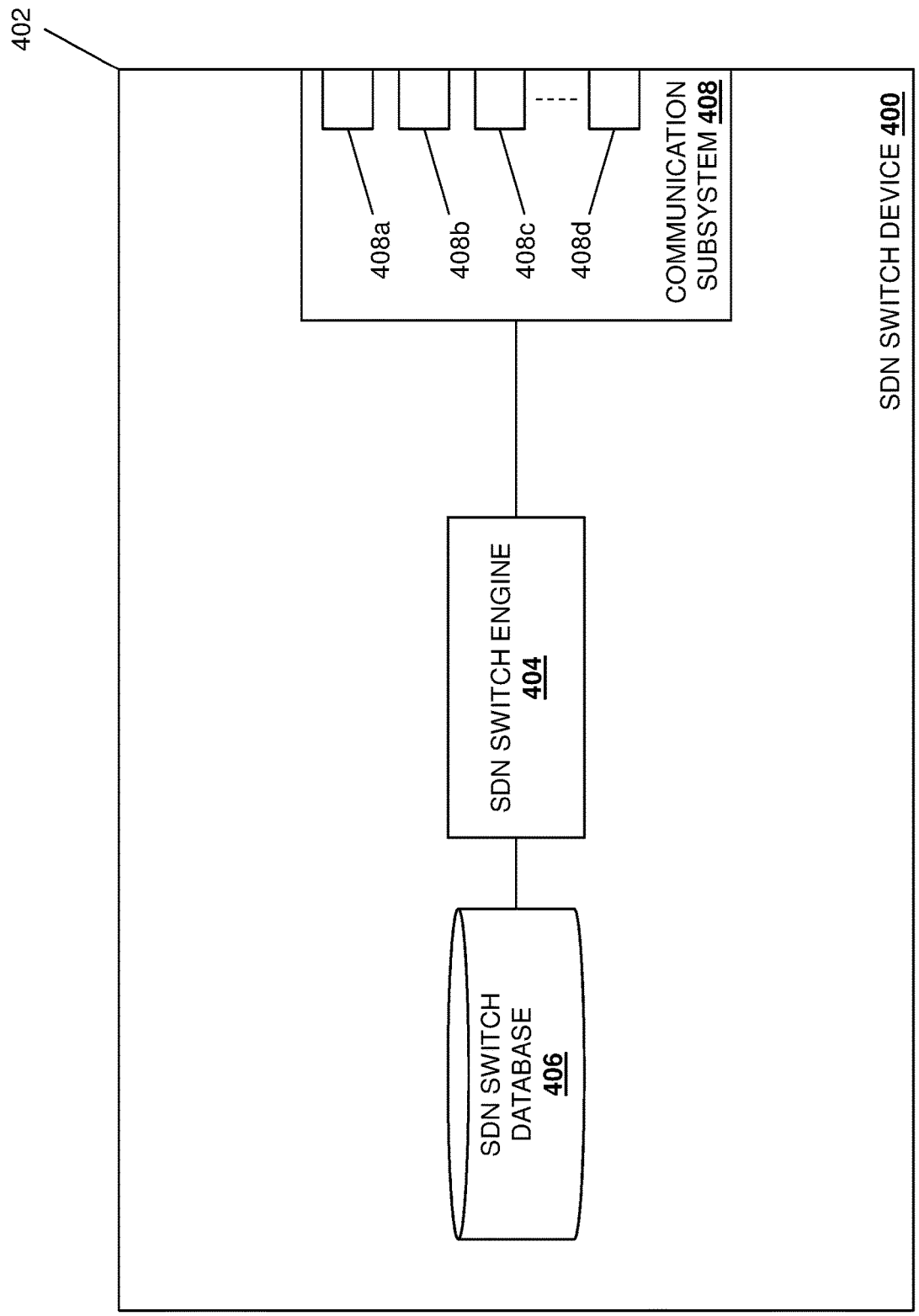
FIG. 4 is a schematic view illustrating an embodiment of a storage defined networking (SDN) switch device used in the centralized storage-connected switch port auto-configuration system of FIG. 2.

Referring now to FIG. 4, an embodiment of an SDN switch device 400 is illustrated that may be either the SDN switch device 202 discussed above with reference to FIG. 2. As such, the SDN switch device 400 may be the IHS 100 discussed above with reference to FIG. 1, may include some or all of the components of the IHS 100, and in specific embodiments may be a switch device that is configured to communicate via the OPENFLOW® protocol, although the use of other SDN protocols (e.g., the Open Network Environment provided by CISCO® Systems of San Jose, Calif., United States; the network virtualization platform provided by NICIRA®/VMWARE of Palo Alto, Calif., United States; and/or other SDN protocols known in the art) will fall within the scope of the present disclosure as well. In the illustrated embodiment, the SDN switch device 400 includes a chassis 402 that houses the components of the SDN switch device 400, only some of which are illustrated in FIG. 4. For example, the chassis 402 may house a processing system (not illustrated, but which may include the processor 102 discussed above with reference to FIG. 1) and a memory system (not illustrated, but which may include the memory 114 discussed above with reference to FIG. 1) that includes instructions that, when executed by the processing system, cause the processing system to provide an SDN switch engine 404 that is configured to perform the functions of the SDN switch engines and SDN switch devices discussed below.

The chassis 402 may also house a storage device (not illustrated, but which may include the storage device 108 discussed above with reference to FIG. 1) that is coupled to the SDN switch engine 404 (e.g., via a coupling between the storage device and the processing system) and that includes an SDN switch database 406 that stores data and/or other information utilized to provide the functionality discussed below. The chassis 402 may also house a communication subsystem 408 that is coupled to the SDN switch engine 404 (e.g., via a coupling between the communication subsystem 308 and the processing system) and that may include a Network Interface Controller (NIC), a wireless communication device (e.g., a BLUETOOTH® wireless communication device, a Near Field Communication (NFC) device, a WiFi communication devices, and/or other wireless communication devices known in the art), and/or other communication components known in the art. In a specific embodiment, the communication subsystem 408 may include ports 408a, 408b, 408c, and up to 408d utilized for providing the links to the storage devices 206a-c as discussed below. While a specific embodiment of an SDN switch device has been illustrated and described, one of skill in the art in possession of the present disclosure will recognize that SDN switch devices may include a variety of other components for providing conventional SDN switch device functionality, as well as the functionality discussed below, while remaining within the scope of the present disclosure.

Figure 5:
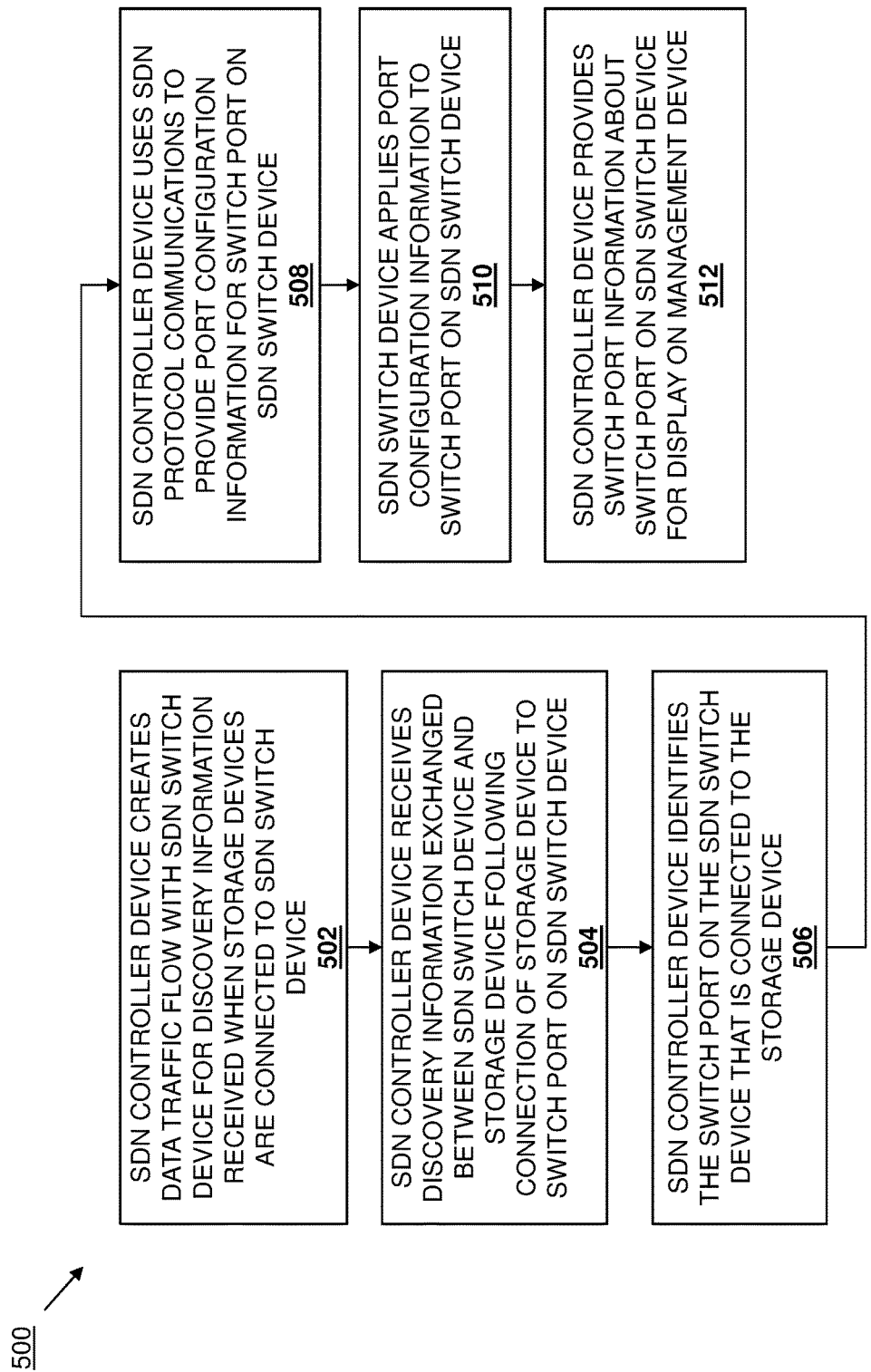
FIG. 5 is a flow chart illustrating an embodiment of a method of providing centralized storage-connected switch port auto-configuration.

Referring now to FIG. 5, an embodiment of a method 500 for centralized storage-connected switch port auto-configuration is illustrated. As discussed above, the systems and methods of the present disclosure provide for the automatic and centralized configuration of storage-connected ports using Software Defined Networking (SDN) protocols such as the OPENFLOW® protocol. For example, the embodiments discussed below leverage the OPENFLOW® protocol to define a flow in an SDN switch device that causes the SDN switch device to forward to an SDN controller device any Link Layer Discovery Protocol (LLDP) packets that are received by the SDN switch device from internet Small Computer System Interface (iSCSI) storage devices when those iSCSI storage devices are directly connected to ports on that SDN switch device. The SDN controller device may then identify the port on the SDN switch device to which an iSCSI storage device was connected in the LLDP packets, and provide OPENFLOW® message(s) to the SDN switch device that cause the SDN switch device to perform desired configurations for that port such as, for example, a Maximum Transmission Unit (MTU) size configuration, a unicast storm control configuration, and a Spanning Tree Protocol (STP) configuration that optimize the port for communicating with the iSCSI storage device. Following the configuration of storage-connected port(s) on the SDN switch device, the SDN switch device may be controlled centrally from the SDN controller device, and monitored for iSCSI storage device statistics generated by the communications between the SDN switch device and the iSCSI storage device.

The method 500 begins at block 502 where an SDN controller device creates a data traffic flow with an SDN switch device for discovery information received when storage devices are connected to the SDN switch device. In an embodiment, at or prior to block 502, the SDN switch device 202 may be connected to the SDN controller device 208 and started up, rebooted, and/or otherwise initialized. Following the connection of the SDN switch device 202 to the SDN controller device 208 and the initialization of the SDN switch device, the SDN switch device 202 and the SDN controller device 208 may communicate to establish an SDN connection by, for example, performing an initial handshake (e.g., the exchange of "hello" and "acknowledgement" messages between the SDN switch device 202 and the SDN controller device 208), performing a feature request by the SDN controller device 208 and a feature response by the SDN switch device 202, and/or performing other SDN connection establishment communications. The specific details of SDN connection establishment (e.g., the establishment of an OPENFLOW connection) are known in the art and thus not described herein, but one of skill in the art in possession of the present disclosure will recognize that following the establishment of the SDN connection, the SDN controller device 208 may have received a variety of information about features (e.g., components, configurations, etc.) available on the SDN switch device 202.

At block 502, the SDN controller engine 304 in the SDN controller device 208/300 provides (e.g., "pushes" via the communication subsystem 308) flow creation information to the SDN switch device 202 that includes data for creating a flow in the SDN switch device 202 that is configured to cause the SDN switch device 202 to capture, "trap", or otherwise identify and prepare discovery information that is exchanged with storage devices for forwarding to the SDN controller device 208. For example, the flow creation information may be configured to cause the SDN switch device 202 to forward LLDP packets that are exchanged with iSCSI storage devices to the SDN controller device 208. The specific details of the creation by an SDN controller device of a flow (e.g., the creation of an OPENFLOW flow session) in an SDN switch device are known in the art and thus not described herein, but one of skill in the art in possession of the present disclosure will recognize that flow creation may include the programming of flow rules and/or other flow details in the SDN switch device 202 to provide the functionality described herein. In an embodiment, at block 502, the SDN switch engine 404 may operate in cooperation with the SDN controller engine 304 to create the flow according to the flow creation information, and following block 502 the SDN switch engine 404 is configured to handle data traffic according to that flow.

The method 500 proceeds to block 504 where the SDN controller device receives discovery information exchanged between the SDN switch device and a storage device following the connection of that storage device to a switch port on the SDN switch device. In an embodiment, at or prior to block 504, a storage device (e.g., the storage device 206a in the examples below) may be connected to a port (e.g., the port 408a in the examples below) on the SDN switch device 202 and, in response, that storage device and the SDN switch device 202 may exchange discovery information. In the examples below, the storage device 206a is an iSCSI storage device, and upon its connection to the port 408a on the SDN switch device 202, the storage device 206a and the SDN switch device 202 exchange LLDP packets via the port 408a. In response, the SDN switch engine 404 may provide that discovery information through the communication subsystem 408 to the SDN controller device 208. For example, according to the flow created at block 502 as discussed above, the SDN switch engine 404 may forward one or more LLDP packets exchanged with the storage device 206a to the SDN controller device 208. At block 504, the SDN controller engine 304 may receive the discovery information through the communication subsystem 308.

The method 500 proceeds to block 506 where the SDN controller device identifies the switch port on the SDN switch device that is connected to the storage device. In an embodiment, at block 506, the SDN controller engine 304 in the SDN controller device 300 may use the discovery information received at block 504 to identify the switch port 408a on the SDN switch device 202 to which the storage device 206a was connected. For example, the SDN controller engine 304 may identify the switch port 408a via OPENFLOW® packets in messages exchanged between the SDN switch device 202 and the SDN controller device 208 according to the flow created at block 502 whenever LLDP packets are exchanged between the SDN switch device 202 and the storage device 206a. As such, following block 506, the SDN controller engine 304 is aware of the switch port 408a on the SDN switch device 202 to which the storage device 206a was connected, and one of skill in the art in possession of the present disclosure will recognize that blocks 504 and 506 may be performed with any storage devices (e.g., the storage devices 206b and up to 206c) connected to the SDN switch device 202 such that the SDN controller engine is aware of each switch port on the SDN switch device 202 that is coupled to a respective storage device.

The method 500 proceeds to block 508 where the SDN controller device uses SDN protocol communications to provide port configuration information for the switch port on the SDN switch device. In an embodiment, at block 508, the SDN controller engine 304 in the SDN controller device 300 operates to generate SDN communications that include port configuration information for the switch port 408a identified at block 506, and send those SDN communications through the communications subsystem 308 the SDN switch device 202. For example, at block 508, the SDN controller engine 304 may generate OPENFLOW® port modify communications and send those OPENFLOW® port modify communications through the communications subsystem 308 such that they are received by the SDN switch engine 404 in the SDN switch device 400 (e.g., via its communication subsystem 408.) In a specific example, OPENFLOW® port modify communications to configure a switch port connected to an iSCSI storage device may include the following information:

```
typedef enum
{
PORT_CONFIG_DOWN = 1<< 0, /**<Port is administratively down.*/
PORT_NO_RECV = 1<<2, /**<Drop all packets received by port.*/
PORT_NO_FWD - 1 << 5, /**<Drop packets forwarded to port.*/
PORT_NO_PACKET_IN = 1 << 6, /**Do not send packet-in messages for port.*/
PORT_CONFIG_MAX_MTU = 1<< 7, /**Modify the MTU size to Max for port.*/
PORT_CONF_STP = 1 << 8, /**<Modify STP for port.*/
PORT_CONF_STORMCONTROL = 1 << 9/**<Modify Storm Control for port.*/
} PORT_CONFIG_t;
/** Features of ports available in a datapath.*/
Typedeef enum
{
/**10 Mb half-duplex rate support.*/
PORT_FEAT_10MB_HD = 1 << 0,
........................Existing features.............................
-------------------------New Features--------------------------------
/*Enable the Stormcontrol for unicast Ingress*/
STORMCONTROL_ENABLE_UNICAST_INGRESS = 1 << 16,
/*Enable the Stormcontrol for unicast Engress*/
STORMCONTROL_ENABLE_UNICAST_EGRESS = 1 << 17,
/*Disable the Stormcontrol for unicast Ingress*/
STORMCONTROL_DISABLE_UNICAST_INGRESS = 1 << 18,
/*Disable the Stormcontrol for unicast Engress*/
STORMCONTROL_DISABLE_UNICAST_EGRESS = 1 << 19,
/*Enable the Stormcontrol for broadcast Ingress*/
STORMCONTROL_ENABLE_BROADCAST_INGRESS = 1 << 20,
/*Enable the Stormcontrol for broadcast Engress*/
STORMCONTROL_ENABLE_BROADCAST_EGRESS = 1 << 21,
/*Disable the Stormcontrol for broadcast Ingress*/
STORMCONTROL_DISABLE_BROADCAST_INGRESS = 1 << 22,
/*Disable the Stormcontrol for broadcast Engress*/
STORMCONTROL_DISABLE_BROADCAST_EGRESS = 1 << 23,
/*Enable the Stormcontrol for multicast Ingress*/
STORMCONTROL_ENABLE_MULTCAST_INGRESS = 1 << 24,
/*Enable the Stormcontrol for multicast Engress*/
STORMCONTROL_ENABLE_MULTICAST_EGRESS = 1 << 25,
/*Disable the Stormcontrol for multicast Ingress*/
STORMCONTROL_DISABLE_MULTICAST_INGRESS = 1 << 26,
/*Disable the Stormcontrol for multicast Engress*/
STORMCONTROL_DISABLE_MULTICAST_EGRESS = 1 << 27,
/*Enable the Stormcontrol for PFC_LLC Ingress*/
STORMCONTROL_ENABLE_ PFC_LLC_INGRESS = 1 << 28,
/*Enable the Stormcontrol for PFC_LLC Engress*/
STORMCONTROL_ENABLE_ PFC_LLC_EGRESS = 1 << 29,
/*Disable the Stormcontrol for PFC_LLC Ingress*/
STORMCONTROL_DISABLE_ PFC_LLC_INGRESS = 1 << 30,
/*Disable the Stormcontrol for PFC_LLC Engress */
STORMCONTROL_DISABLE_ PFC_LLC_EGRESS = 1 << 31,
/*Enable the Stormcontrol for PFC Ingress*/
STORMCONTROL_ENABLE_ PFC_INGRESS = 1 << 32,
/*Enable the Stormcontrol for PFC Engress*/
STORMCONTROL_ENABLE_ PFC_EGRESS = 1 << 33,
/*Disable the Stormcontrol for PFC Ingress*/
STORMCONTROL_DISABLE_ PFC_INGRESS = 1 << 34,
/*Disable the Stormcontrol for PFC Engress*/
STORMCONTROL_DISABLE_ PFC_EGRESS = 1 << 35,
/*STP Listening*/
STP_LISTENING = 1 << 36,
/*STP Learning*/
STP_LEARNING = 1 << 37,
/*STP Forwarding*/
STP_FORWARDING = 1 << 38,
/*STP Blocking*/
STP_BLOCKING = 1 << 39,
/*STP Disabled*/
STP_DISABLED = 1 << 40,
-------------------------New Features--------------------------------
} PORT_FEATURE_t;
```

One of skill in the art in possession of the present disclosure will recognize that "PORT_CONFIG_MAX_MTU=1<<7, /**Modify the MTU size to Max for port.*/" in the OPENFLOW® port modify communications above is an embodiment of a port packet data unit size configuration for the switch port that may be provided to configure a packet data unit size that may be transmitted via the switch port, and provides a specific example of a Maximum Transmission Unit (MTU) size configuration that may be provided to configure the switch port to have a maximum MTU size. One of skill in the art in possession of the present disclosure will also recognize that "PORT_CONF_STP=1<<8, /**<Modify STP for port.*/" in the OPENFLOW® port modify communications above is an embodiment of a port loop prevention configuration for the switch port that may be provided to configure loop prevention designations that will be available for the switch port, and provides a specific example of a Spanning Tree Protocol (STP) configuration that may be provided to configure the switch port to disable the STP on the switch port to prevent STP designations from being applied to the switch port. One of skill in the art in possession of the present disclosure will also recognize that "PORT_CONF_STORMCONTROL=1<<9/**<Modify Storm Control for port.*/" in the OPENFLOW® port modify communications above is an embodiment of a port traffic suppression configuration for the switch port that may be provided to configure an amount of bandwidth of the switch port that will be available to transmit at least one type of data traffic, and provides a specific example of a unicast storm control configuration that may be provided to configure the switch port to disable unicast storm control on the switch port to enable unicast data traffic to utilize any of the available bandwidth of the switch port.

One of skill in the art in possession of the present disclosure will also recognize that /*Enable the Stormcontrol for unicast Ingress*/STORMCONTROL_ENABLE_UNICAST_INGRESS=1<<16", "/*Enable the Stormcontrol for unicast Engress*/ STORMCONTROL_ENABLE_UNICAST_EGRESS=1<<17", "/*Disable the Stormcontrol for unicast Ingress*/ STORMCONTROL_DISABLE_UNICAST_INGRESS=1<<18", "/*Disable the Stormcontrol for unicast Engress*/STORMCONTROL_DISABLE_UNICAST_EGRESS=1<<19", "/*Enable the Stormcontrol for broadcast Ingress*/ STORMCONTROL_ENABLE_BROADCAST_INGRESS=1<<20", "/*Enable the Stormcontrol for broadcast Engress*/STORMCONTROL_ENABLE_BROADCAST_EGRESS=1<<21", "/*Disable the Stormcontrol for broadcast Ingress*/ STORMCONTROL_DISABLE_BROADCAST_INGRESS=1<<22", "/*Disable the Stormcontrol for broadcast Engress*/STORMCONTROL _DISABLE_BROADCAST_EGRESS=1<<23", "/*Enable the Stormcontrol for multicast Ingress*/ STORMCONTROL_ENABLE_MULTICAST_INGRESS=1<<24", "/*Enable the Stormcontrol for multicast Engress*/ STORMCONTROL_ENABLE_MULTICAST_EGRESS= 1<<25", "/*Disable the Stormcontrol for multicast Ingress*/ STORMCONTROL_DISABLE_MULTICAST_INGRESS=1<<26", "/*Disable the Stormcontrol for multicast Engress*/ STORMCONTROL_DISABLE_MULTICAST_EGRESS=1<<27", "/*Enable the Stormcontrol for PFC_LLC Ingress*/ STORMCONTROL_ENABLE_PFC_LLC_INGRESS=1<<28", "/*Enable the Stormcontrol for PFC_LLC Engress*/ STORMCONTROL_ENABLE_PFC_LLC_EGRESS=1<<29", "/*Disable the Stormcontrol for PFC_LLC Ingress*/STORMCONTROL_DISABLE_PFC_LLC_INGRESS=1<<30", "/*Disable the Stormcontrol for PFC_LLC Engress*/ STORMCONTROL_DISABLE_PFC_LLC_EGRESS=1<<31", "/*Enable the Stormcontrol for PFC Ingress*/ STORMCONTROL_ENABLE_ PFC_INGRESS=1<<32", "/*Enable the Stormcontrol for PFC Engress*/ STORMCONTROL_ENABLE_ PFC_EGRESS= 1<<33", "/*Disable the Stormcontrol for PFC Ingress*/ STORMCONTROL_DISABLE_PFC_INGRESS=1<<34", "/*Disable the Stormcontrol for PFC Engress*/STORMCONTROL_DISABLE_PFC_EGRESS=1<<35", in the OPENFLOW® port modify communications above is part of the port traffic suppression configuration for the switch port, discussed above, that may be provided to configure an amount of bandwidth of the switch port that will be available to transmit at least one type of data traffic, and provides a specific example of a unicast storm control configuration discussed above that may be provided to configure the switch port to disable unicast storm control on the switch port to enable unicast data traffic to utilize any of the available bandwidth of the switch port.

One of skill in the art in possession of the present disclosure will also recognize that "/*STP Listening*/ STP_LISTENING=1<<36", "/*STP Learning*/ STP_LEARNING=1<<37", /*STP Forwarding*/ STP_FORWARDING=1<<38", "/*STP Blocking*/ STP_BLOCKING=1<<39", AND "/*STP Disabled*/ STP_DISABLED=1<<40" in the OPENFLOW® port modify communications above is part of the port loop prevention configuration for the switch port, discussed above, that may be provided to configure loop prevention designations that will be available for the switch port, and provides a specific example of the Spanning Tree Protocol (STP) configuration discussed above that may be provided to configure the switch port 408a to disable the STP on the switch port 408a to prevent STP designations from being applied to the switch port.

While specific examples of OPENFLOW® port modify communications for switch ports connected to iSCSI storage devices have been described above, one of skill in the art in possession of the present disclosure will recognize that other types of SDN communications may be provided that are similar to the OPENFLOW® port modify communications discussed above in order to allow those SDN communications to transmit port configurations from the SDN controller device 208 to the SDN switch device 202, and those other types of SDN communications will fall within the scope of the present disclosure as well. Similarly, one of skill in the art in possession of the present disclosure will recognize that other port configurations may be provided to configure ports connected to storage devices other than iSCSI storage devices, and/or those port configurations will fall within the scope of the present disclosure as well.

The method 500 proceeds to block 510 where the SDN switch device applies the port configuration information to the switch port on the SDN switch device. In an embodiment, at block 510, the SDN switch engine 404 in the SDN switch device 202/400 may operate to apply the port configuration information received at block 508 to the switch port 408a that is connected to the storage device 206a. In an embodiment, the SDN switch engine 404 may apply a port packet data unit size configuration received at block 508 to the switch port 408a in order to configure a packet data unit size that may be transmitted via the switch port. For example, the SDN switch engine 404 may apply a Maximum Transmission Unit (MTU) size configuration received at block 508 to configure the switch port 408a to have a maximum MTU size. In an embodiment, the SDN switch engine 404 may apply a port loop prevention configuration received at block 508 to the switch port 408a to configure loop prevention designations that will be available for the switch port. For example, the SDN switch engine 404 may apply a Spanning Tree Protocol (STP) configuration received at block 508 to configure the switch port 408a to disable the STP on the switch port 408a to prevent STP designations from being applied to the switch port 408a. In an embodiment, the SDN switch engine 404 may apply a port traffic suppression configuration received at block 508 to the switch port 408a to configure an amount of bandwidth of the switch port 408a that will be available to transmit at least one type of data traffic. For example, the SDN switch engine 404 may apply a unicast storm control configuration received at block 508 to configure the switch port 408a to disable unicast storm control on the switch port 408a to enable unicast data traffic to utilize any of the available bandwidth of the switch port 408a. As such, the switch ports 408a-d on the SDN switch device 202 connected to storage devices 206a-c in the SAN 206 may be automatically configured in a centralized manner from the SDN controller device, and one of skill in the art in possession of the present disclosure will recognize that the specific configurations discussed above provide for the optimization of those switch ports 408a-d with regard to their operation with iSCSI storage devices. However, as discussed above, other port configurations that provide for the optimization of ports for other types of storage devices are envisioned as falling within the scope of the present disclosure as well.

Figure 6:
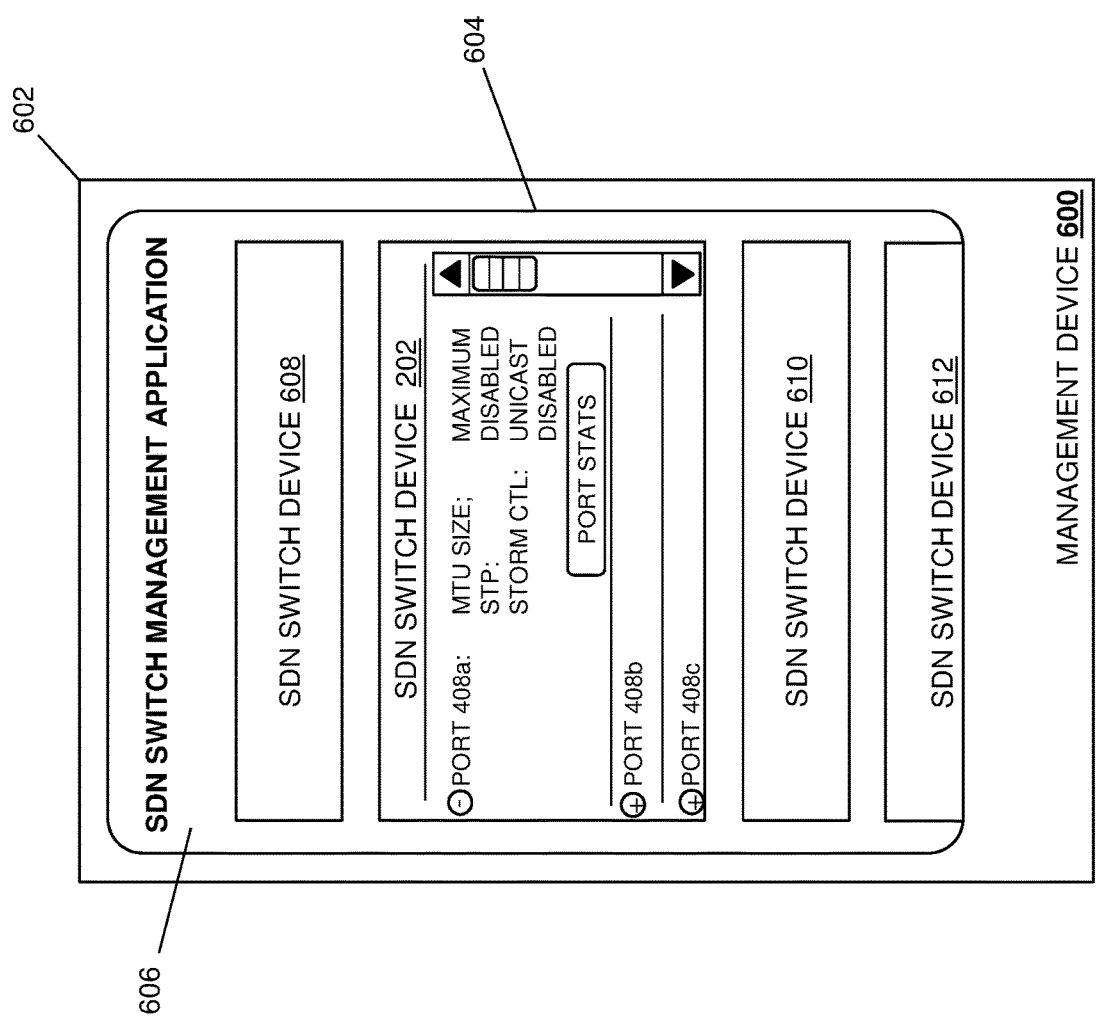
FIG. 6 is a screen shot view illustrating an embodiment of a management device displaying a management application that may be used in the centralized storage-connected switch port auto-configuration system of FIG. 2.

The method 500 proceeds to block 512 where the SDN controller device provides switch port information about the switch port on the SDN switch device for display on a management device. In an embodiment, at block 512, the SDN controller engine 304 in the SDN controller device 208/300 may provide switch port information about the switch port 408a through its communication system 308 and to the management device 210 for display. For example, a network administrator or other user may utilize the management device 210 to access the SDN controller device 208, and request management information about the centralized storage-connected switch port auto-configuration system 200 (e.g., the SDN network) and, in response, the SDN controller device 208 may provide that management information for display on the management device 210. FIG. 6 illustrates an embodiment of a management device 600 that may be the management device 210 discussed above with reference to FIG. 2. The management device 600 includes a chassis 602 having a display device 604 displaying a management application 606. For example, the management application 606 may provide for access to the SDN controller device 208 for retrieval of information about the centralized storage-connected switch port auto-configuration system 200 (e.g., the SDN network.)

In the illustrated embodiment, the management application 606 is displaying a list of SDN switch devices via graphical user interface (GUI) elements that identify an SDN switch device 608, an SDN switch device 610, an SDN switch device 612, and the SDN switch device 202 discussed above with reference to FIG. 2. One of skill in the art in possession of the present disclosure will recognize that the management application 606 may provide access to information about SDN switch devices not discussed above (e.g., the SDN switch devices 608, 610, and 612, as well as other SDN switch devices that may be accessed via GUI elements available by "scrolling down" on the management application illustrated in FIG. 6, and which may be provided in the SDN network that includes the centralized storage-connected switch port auto-configuration system 200, or other SDN networks not discussed above.) In the illustrated example, the user of the management device 600 has selected the GUI element for the SDN switch device 202, which has caused that GUI element to expand to provide GUI elements for selecting ports 408a, 408b, and 408c on the SDN switch device 202, and one of skill in the art in possession of the present disclosure will recognize that the user may "scroll down" on the GUI element for the SDN switch device 202 to access other ports (i.e., up to port 408d) on the SDN switch device 202. In the illustrated example, the user has selected the GUI element for the port 408a to cause that GUI element to expand to provide port information about the port 408a. In the illustrated example, the port information includes the configurations provided on the port 408a discussed above (e.g., a maximum MTU size, STP disabled, and unicast storm control disabled), and a port stats button is provided for selection to allow the user to view port statistics generated by the operation of the port (i.e., communications between the SDN switch device 202 and the storage device 206a via the port 408a.) While a specific example of management information in the form of port information about a port has been provided, one of skill in the art in possession of the present disclosure will recognize that a variety of other management information may be retrieved by the SDN controller device 208 from the SDN switch device 2020 and provided to the management device 210 while remaining within the scope of the present disclosure.

Thus, systems and methods have been described that provide for the centralized and automatic configuration of storage-connected ports on any number of SDN switch devices via the use of SDN communications. In specific embodiments, those systems and methods provide for centralize, SDN-communication-based iSCSI storage device auto-detection and iSCSI port auto-configuration of ports directly connected to iSCSI storage devices via flow-based LLDP packet forwarding by the SDN switch device and port configuration pushing by the SDN controller device. The centralized auto-configuration provided by the systems and methods of the present disclosure negates the need for manual setup of iSCSI port auto-configuration in conventional switch devices, as well as issues that can be introduced when storage devices from different storage device vendors are connected to such conventional switch devices.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A centralized storage-connected switch port auto-configuration system, comprising:
   a storage device that is configured to cause discovery information to be transmitted from the storage device in response to connection of the storage device to a switch port;
   a Software Defined Networking (SDN) switch device that is configured to receive the discovery information from the storage device in response to the storage device being connected to the switch port on the SDN switch device; and
   an SDN controller device that is coupled to the SDN switch device and that is configured to:
      create a data traffic flow between the SDN switch device and the SDN controller device, wherein the data traffic flow causes the SDN switch device to forward the discovery information received from the storage device to the SDN controller device;
      receive, from the SDN switch device subsequent to the storage device being connected to the switch port on the SDN switch device and via the data traffic flow, the discovery information;
      identify, using the discovery information, the switch port on the SDN switch device that is connected to the storage device;
      provide, to the SDN switch device via SDN protocol communications, a port packet data unit size configuration, a port traffic suppression configuration, and a port loop prevention configuration, wherein the SDN switch device is configured to:
  apply the port packet data unit size configuration to the switch port to configure a packet data unit size that will be transmitted via the switch port;
  apply the port traffic suppression configuration to the switch port to configure the amount of bandwidth of the switch port that will be available to transmit at least one type of data traffic; and
  apply the port loop prevention configuration to the switch port to configure loop prevention designations that will be available for the switch port.

2. The system of claim 1, wherein the port packet data unit size configuration is a Maximum Transmission Unit (MTU) size configuration that provides for the transmission of a maximize MTU size via the switch port.

3. The system of claim 1, wherein the port traffic suppression configuration is a unicast storm control configuration that disables unicast storm control on the switch port to enable unicast data traffic to utilize any of the available bandwidth of the switch port.

4. The system of claim 1, wherein the port loop prevention configuration is a Spanning Tree Protocol (STP) configuration that disables STP on the switch port to prevent STP designations from being applied to the switch port.

5. The system of claim 1, wherein the discovery information is included in one or more Link Layer Discovery Protocol (LLDP) packets.

6. The system of claim 1, wherein the SDN controller device is configured to:
  provide, for display on a management device, management information that includes identifiers for the storage device and the port.

7. An information handling system (IHS), comprising:
  a processing system; and
  a memory system that is coupled to the processing system and that include instructions that, when executed by the processing system, cause the processing system to provide a Software Defined Networking (SDN) controller engine that is configured to:
    create a data traffic flow between the SDN switch device and the SDN controller engine, wherein the data traffic flow causes the SDN switch device to forward the discovery information received from storage devices to the SDN controller engine;
    receive, from an SDN switch device subsequent to a storage device being connected to a switch port on the SDN switch device and via the data traffic flow, discovery information that the storage device causes to be sent from the storage device to the SDN switch device and forwarded to the SDN controller engine upon connection of the storage device to the switch port on the SDN switch device;
    identify, using the discovery information, the switch port on the SDN switch device that is connected to the storage device; and
    provide, to the SDN switch device via SDN protocol communications, each of:
      a port packet data unit size configuration that defines a packet data unit size that will be transmitted via the switch port;
      a port traffic suppression configuration that defines the amount of bandwidth of the switch port that will be available to transmit at least one type of data traffic; and
      a port loop prevention configuration that defines loop prevention designations that will be available for the switch port.

8. The IHS of claim 7, wherein the port packet data unit size configuration is a Maximum Transmission Unit (MTU) size configuration that provides for the transmission of a maximize MTU size via the switch port.

9. The IHS of claim 7, wherein the port traffic suppression configuration is a unicast storm control configuration that disables unicast storm control on the switch port to enable unicast data traffic to utilize any of the available bandwidth of the switch port.

10. The IHS of claim 7, wherein the port loop prevention configuration is a Spanning Tree Protocol (STP) configuration that disables STP on the switch port to prevent STP designations from being applied to the switch port.

11. The IHS of claim 7, wherein the SDN controller engine is configured to:
  provide, for display on a management device, management information that includes identifiers for the storage device and the port.

12. A method for centralized storage-connected switch port auto-configuration, comprising:
  creating, by a Software Defined Networking (SDN) controller device, a data traffic flow with a SDN switch device that causes the SDN switch device to forward discovery information received from storage devices to the SDN controller device;
  receiving, by the SDN controller device from the SDN switch device subsequent to a storage device being connected to a switch port on the SDN switch device and via the data traffic flow, discovery information that the storage device causes to be sent from the storage device to the SDN switch device and forwarded to the SDN controller engine upon connection of the storage device to the switch port on the SDN switch device;
  identifying, by the SDN controller device using the discovery information, the switch port on the SDN switch device that is connected to the storage device; and
  providing, by the SDN controller device to the SDN switch device via SDN protocol communications, each of:
    a port packet data unit size configuration that, when applied by the SDN switch device to the switch port, provides a packet data unit size that will be transmitted via the switch port;
    a port traffic suppression configuration that, when applied by the SDN switch device to the switch port, provides the amount of bandwidth of the switch port that will be available to transmit at least one type of data traffic; and
    a port loop prevention configuration that, when applied by the SDN switch device to the switch port, provides loop prevention designations that will be available for the switch port.

13. The method of claim 12, wherein the port packet data unit size configuration is a Maximum Transmission Unit (MTU) size configuration that provides for the transmission of a maximize MTU size via the switch port.

14. The method of claim 12, wherein the port traffic suppression configuration is a unicast storm control configuration that disables unicast storm control on the switch port to enable unicast data traffic to utilize any of the available bandwidth of the switch port.

15. The method of claim 12, wherein the port loop prevention configuration is a Spanning Tree Protocol (STP)

configuration that disables STP on the switch port to prevent STP designations from being applied to the switch port.

16. The method of claim 12, wherein the discovery information is included in one or more Link Layer Discovery Protocol (LLDP) packets.

17. The method of claim 12, further comprising:
providing, by the SDN controller device for display on a management device, management information that includes identifiers for the storage device and the port.

* * * * *